Aug. 12, 1958 U. GÜNTHER 2,846,950
ELECTRICAL IMPACT FUSES
Filed Feb. 11, 1954
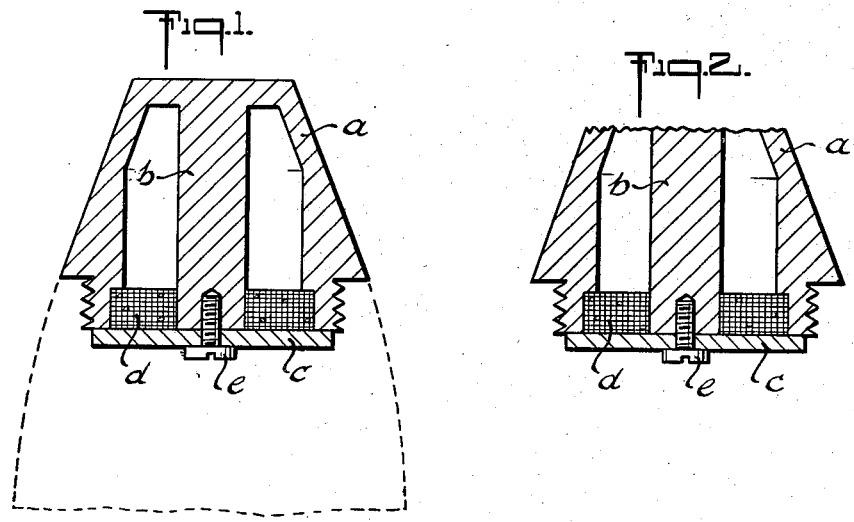
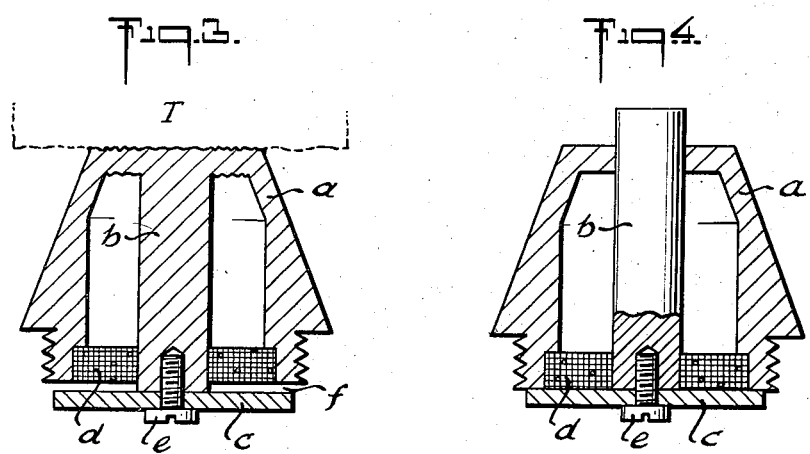
INVENTOR:
ULRICH GÜNTHER
BY
Morrison Kennedy & Campbell
ATTORNEYS.

2,846,950

ELECTRICAL IMPACT FUSES

Ulrich Günther, Zurich, Switzerland, assignor to Inventa A.-G., für Forchung und Patentverwertung Luzern, Lucerne, Switzerland Application February 11, 1954, Serial No. 409,613

Claims priority, application Switzerland February 19, 1953

3 Claims. (Cl. 102—70.2)

Different electrical methods are used for the electric ignition of explosive projectiles on contacting the target. One of these is based on the arrangement at the forward end or tip of the projectile of a permanent magnet system provided with an induction coil and forming the nose of the projectile. The core of the magnetic coil in such a system is extended in the form of a rod which projects from the tip of the projectile and, which on contacting the target, is pushed into the interior of the projectile, whereby the magnetic circuit is interrupted and an electric voltage is induced in the coil which causes an electrically operated detonator connected to the magnet coil to explode.

This arrangement has not, however, proved satisfactory in practice. Experiments have shown that, at high projectile velocities, the inertia of the parts contacting the target is much too great to enable the magnetic core to move rapidly. Instead of this, the impact energy very often leads to damage or destruction of the parts which strike the target. The end is first broken off then a deformation and upsetting take place and only at last does an alteration in position of the core by movement in the axial direction take place. It is, therefore, possible that the induction coil in the interior of the magnet may have already been destroyed by the impact on the target before the magnetic core starts to move. The fuse, therefore, fails to act.

The subject of the present invention is a fuse or electrical ignition device having a magnetic system in which the above-mentioned failure is obviated. This result is obtained by providing a magnet with a magnet coil to produce and conduct magnetic flux and by extending axially outwardly the walls of the magnet so that they form the outer surface of the tip of the projectile, with the result that, if the tip is destroyed on contact with the target, the path of the magnetic flux is interrupted, and the igniting current is generated in the magnet coil. The magnet coil should be disposed around the part of the magnet which is most ramote from the forward end or tip in the axial direction.

When employing relatively small projectile velocities, or when the projectile is intended to make contact with a target which does not consist of solid material, the tip of the projectile may not be destroyed to such an extent that the path of magnetic flux is interrupted. Therefore, in accordance with a further feature of the invention, the magnet is constructed in such a way that even a small deformation of the tip, and a displacement of the magnet core produced thereby, causes an immediate interruption in the path of the magnetic flux upon impact. For this purpose, the end faces of the core and of the extended wall on the side of the magnet remote from the tip described above, are covered with a steel base plate which bears against them without leaving an air gap, and which closes the magnetic circuit. If then, on striking the target, the magnet core moves in axial direction towards this base-plate, the base-plate is moved with the core and separated from the end face of the extended wall, whereby the path of the magnetic flux is interrupted at this place, and an igniting voltage is induced in the magnet coil.

For particularly sensitive fuses, which are intended to be fired at soft targets, such as snow for example, this separation of the base plate can be facilitated if, instead of making the tip of the magnetic core integral with the extended outer wall, the core is made to pass through and to be axially displaceable in a cylindrical bore in the end of the outer wall in which it snugly and slidably fits. To assure safety on firing, the position of the magnet core relative to the outer wall can be fixed by a safety device of any suitable kind, such as a screw or a locking pin.

In order that the invention may be easily understood and readily carried into effect, some embodiments of the invention are illustrated, by way of example, in the accompanying drawing in which the four figures are in axial section:

Fig. 1 is a section through the first embodiment before impact;

Fig. 2 is a section through the embodiment of Fig. 1 after impact;

Fig. 3 is a section similar to Fig. 2, but showing how the magnetic circuit is interrupted owing to movement of the base-plate; and Fig. 4 is a section through an embodiment for use with soft targets and low velocities.

Referring to Fig. 1 of the drawings, the fuse of the present invention is arranged to form the nose of a projectile and constitutes a permanent magnet having an annular casing or wall $a$ defining a housing for a magnetic coil $d$. Extending axially of the fuse through the center of the housing is a magnetic core $b$. The annular wall $a$ defines two side legs of the magnet extending to the forward end of the fuse and laterally to the magnetic core to connect integrally thereto and to form with said core part of the path of the magnetic flux circuit.

The rear end of the core $b$ and the rear end of the annular wall $a$ are covered by a base-plate $c$, whereby a closed circuit for the magnetic flux generated by the magnet free from any air gap is provided. Preferably, the base-plate $c$ is rigidly connected to the magnet core $b$ by a screw $e$.

When the fuse is assembled on to the projectile, the magnet coil $d$ is connected to the electric detonator. Any interruption in the closed path of the magnetic flux induces a current in the magnetic coil $d$ which is transmitted to the detonator to fire said detonator.

The magnetic coil $d$ is located in the housing defined by the annular wall $a$ at the rear end thereof remote from the zone of initial impact, so that the coil is not injured by the impact.

The rear end of the annular wall $a$ is threaded for engagement with the forward end of the projectile.

Fig. 1 shows the fuse in initial condition before impact. Fig. 2 shows the fuse after high velocity impact and after the forepart of the wall $a$ surrounding the magnet core $b$ has been broken open by the impact. This destruction of the forepart of the wall $a$ produces an air gap which interrupts the path of the magnetic flux and induces a current in the magnet coil $d$ which fires the detonator.

Fig. 4 shows a highly sensitive arrangement for use in projectiles of low speed which are fired against soft targets. The arrangement is the same as in Fig. 1 except that the core $b'$ and the magnetic casing $a$ do not consist of one piece, but the core is movable axially in a bore in the forward end of the wall $a$.

When the projectile of Fig. 4 makes contact with the soft target, the core which projects beyond the tip of the projectile is pushed inwardly, whereby the magnetic flux is interrupted owing to the movement of the base-plate $c$ away from the casing $a$.

What is claimed is:

1. An electrical impact fuse for a projectile comprising a permanent magnet arranged to form the nose of the projectile and defining a closed magnetic circuit for the magnetic flux generated by said magnet, said magnet having two spaced side legs constituting the side walls of the nose and extending to the forward end of said fuse, said side legs forming part of the path of said magnetic circuit, a magnet coil disposed in the magnetic field of said magnet and adapted to fire the detonator in said projectile by the current induced therein upon changes in the magnetic field, said magnet coil being located near the rear end of said magnet and spaced a substantial distance axially from the forward ends of said legs, the forward ends of said legs being adapted to be destroyed upon impact, whereby an air gap is created therebetween, causing interruption in the path of the magnetic flux, whereby current is induced in said magnet coil by the resulting change in the magnetic field, a base plate normally connecting the side legs of the magnet near the rear end thereof axially remote from the forward end of said magnet to define part of the path of the magnetic circuit and displaceable axially from said side legs to form an air gap between said side legs and said base plate upon displacement of said base plate, and a rod connected to said base plate and extending axially of said magnet to the forward end thereof, to transmit displacement force to said base plate upon impact with a target, said rod being part of said magnet and constituting the core of said magnet coil, said rod being located between and extending along said legs, said legs at their forward ends extending laterally to said rod.

2. An electrical impact fuse for a projectile comprising a permanent magnet arranged to form the nose of the projectile and defining a closed magnetic circuit for the magnetic flux generated by said magnet, said magnet having two spaced side legs constituting the side walls of the nose and extending to the forward end of said fuse, said side legs forming part of the path of said magnetic circuit, a magnet coil disposed in the magnetic field of said magnet and adapted to fire the detonator in said projectile by the current induced therein upon changes in the magnetic field, said magnet coil being located near the rear end of said magnet and spaced a substantial distance axially from the forward ends of said legs, the forward ends of said legs being adapted to be destroyed upon impact, whereby an air gap is created therebetween, causing interruption in the path of the magnetic flux, whereby current is induced in said magnet coil by the resulting change in the magnetic field, a casing wall defining a housing for said magnet coil, said magnet having a core located in the housing and extending therealong from its rear end to its forward end, said side legs constituting sections of said wall on opposite sides of said core, said casing wall having a forward end section integrally connected to said core, a base plate normally extending across the rear end of said casing wall to define part of the path of the magnetic circuit and connected to the rear end of said core, said base plate being displaceable from the rear end of said casing wall upon lengthwise displacement of the core upon impact with a target to form an air gap between the rear end of said casing wall and said base plate.

3. An electrical impact fuse for a projectile comprising a permanent magnet arranged to form the nose of the projectile and defining a closed magnetic circuit for the magnetic flux generated by said magnet, said magnet having two spaced side legs constituting the side walls of the nose and extending to the forward end of said fuse, said side legs forming part of the path of said magnetic circuit, a magnet coil disposed in the magnetic field of said magnet and adapted to fire the detonator in said projectile by the current induced therein upon changes in the magnetic field, said magnet coil being located near the rear end of said magnet and spaced a substantial distance axially from the forward ends of said legs, the forward ends of said legs being adapted to be destroyed upon impact, whereby an air gap is created therebetween, causing interruption in the path of the magnetic flux, whereby current is induced in said magnet coil by the resulting change in the magnetic field, a casing wall defining a housing for said magnet coil and having a wall section at its forward end with a hole, said magnet having a core located in said housing and extending from its rear end to its forward end and snugly through said hole with a slide fit, said core having its forward end section projecting forward beyond said end wall section, said side legs constituting sections of said casing wall on opposite sides of said core, a base plate normally extending across the rear end of said casing wall to define part of the path of the magnetic circuit and connected to the rear end of said core, whereby upon impact of the projecting section of the core with the target, the core will be displaced axially and the base plate will be displaced correspondingly from the rear end of the casing wall to form an air gap between said side legs.

References Cited in the file of this patent

FOREIGN PATENTS

| | | |
|---|---|---|
| 2,826 | Great Britain | of 1885 |
| 843,734 | France | Apr. 3, 1939 |
| 767,259 | Germany | Apr. 15, 1952 |
| 847,119 | Germany | Aug. 21, 1952 |